US011832268B2

(12) United States Patent
Yang et al.

(10) Patent No.: US 11,832,268 B2
(45) Date of Patent: Nov. 28, 2023

(54) FREQUENCY RESOURCE ALLOCATION OF A BANDWIDTH PART FOR MULTIPLE COMMUNICATION TYPES

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/313,997

(22) Filed: May 6, 2021

(65) Prior Publication Data

US 2021/0352635 A1 Nov. 11, 2021

Related U.S. Application Data

(60) Provisional application No. 63/022,013, filed on May 8, 2020.

(51) Int. Cl.
*H04W 72/10* (2009.01)
*H04W 72/04* (2023.01)
(Continued)

(52) U.S. Cl.
CPC ....... *H04W 72/23* (2023.01); *H04W 72/0453* (2013.01); *H04W 16/14* (2013.01)

(58) Field of Classification Search
CPC .......................... H04W 72/042; H04W 72/045
See application file for complete search history.

(56) References Cited

U.S. PATENT DOCUMENTS 10,333,688 B2\* 6/2019 Zarifi ................ H04W 72/0446
10,869,237 B2\* 12/2020 Wu ........................ H04W 76/14
(Continued)

FOREIGN PATENT DOCUMENTS

WO WO-2020033785 A1 2/2020

OTHER PUBLICATIONS

International Search Report and Written Opinion—PCT/US2021/031231—ISA/EPO—dated Sep. 15, 2021.
(Continued)

*Primary Examiner* — Ronald B Abelson
(74) *Attorney, Agent, or Firm* — Norton Rose Fulbright US LLP/Qualcomm Incorporated

(57) ABSTRACT

In some aspects, a method of wireless communication includes receiving control information by a UE from a base station. The control information indicates one or more first frequency resources of a BWP that are associated with a first communication type and further indicates one or more second frequency resources of the BWP that are associated with a second communication type. The method further includes, based on a first data type of first data corresponding to the first communication type and further based on a second data type of second data corresponding to the second communication type, performing a wireless communication with the base station using the one or more first frequency resources to communicate the first data and using the one or more second frequency resources to communicate the second data.

29 Claims, 7 Drawing Sheets

(51) Int. Cl.
  *H04W 72/23* (2023.01)
  *H04W 72/0453* (2023.01)
  *H04W 16/14* (2009.01)

(56) References Cited

U.S. PATENT DOCUMENTS

| | | | | |
|---|---|---|---|---|
| 2002/0065082 | A1* | 5/2002 | Yegani | H04W 72/10 |
| 2009/0042581 | A1* | 2/2009 | Liu | H04L 5/0007 |
| 2017/0324464 | A1* | 11/2017 | Hieb | H04B 7/18513 |
| 2018/0069664 | A1* | 3/2018 | Khoryaev | H04L 1/1621 |
| 2019/0246419 | A1* | 8/2019 | Sun | H04L 1/1812 |
| 2020/0077432 | A1* | 3/2020 | Xiong | H04L 5/0092 |
| 2020/0413348 | A1* | 12/2020 | Ryu | H04W 52/242 |
| 2021/0345300 | A1* | 11/2021 | Selvanesan | H04L 5/001 |

OTHER PUBLICATIONS

Qualcomm Incorporated: "Summary #2 of Enhancements to Scheduling/HARQ", 3GPP Draft, 3GPP TSG-RAN WG1 Meeting #99, R1-1913564, 3rd Generation Partnership Project (3GPP), Mobile Competence Centre, 650, Route Des Lucioles, F-06921 Sophia-Antipolis Cedex, France, vol. RAN WG1, No. Reno, Nevada, U.S.A, Nov. 18, 2019-Nov. 22, 2019, Nov. 25, 2019 (Nov. 25, 2019), XP051830841, 43 Pages, Retrieved from the Internet: URL: https://ftp.3gpp.org/tsg_ran/WG1_RL1/TSGR1_99/Docs/R1-1913564.zip.

Vivo: "Remaining Issues on Multi-TRP/Panel Transmission", 3GPP Draft, 3GPP TSG RAN WG1 #98, R1-1908166, Remaining Issues on Multi-TRP/Panel Transmission Final, 3rd Generation Partnership Project (3GPP), Mobile Competence Centre, 650, Route Des Lucioles, F-06921 Sophia-Antipolis C, vol. RAN WG1, No. Prague, CZ, Aug. 26, 2019-Aug. 30, 2019, Aug. 17, 2019 (Aug. 17, 2019), XP051764785, 18 Pages, Retrieved from the Internet: URL: http://www.3gpp.org/ftp/tsg_ran/WG1_RL1/TSGR1_98/Docs/R1-1908166.zip.

* cited by examiner

FREQUENCY RESOURCE ALLOCATION OF A BANDWIDTH PART FOR MULTIPLE COMMUNICATION TYPES

CROSS-REFERENCE TO RELATED APPLICATIONS

This application claims the benefit of and priority to U.S. Prov. Pat. App. No. 63/022,013, entitled "FREQUENCY RESOURCE ALLOCATION OF A BANDWIDTH PART FOR MULTIPLE COMMUNICATION TYPES," filed on May 8, 2020, which is expressly incorporated by reference herein in its entirety.

TECHNICAL FIELD

Aspects of the present disclosure relate generally to wireless communication systems, and more particularly, to resource allocation in wireless communication systems.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes receiving control information by a user equipment (UE) from a base station. The control information indicates one or more first frequency resources of a bandwidth part (BWP) that are associated with a first communication type and further indicates one or more second frequency resources of the BWP that are associated with a second communication type. The method further includes, based on a first data type of first data corresponding to the first communication type and further based on a second data type of second data corresponding to the second communication type, performing a wireless communication with the base station using the one or more first frequency resources to communicate the first data and using the one or more second frequency resources to communicate the second data.

In some other aspects of the disclosure, an apparatus includes a memory and one or more processors coupled to the memory. The one or more processors are configured to receive, from a base station, control information indicating one or more first frequency resources of a BWP that are associated with a first communication type and further indicating one or more second frequency resources of the BWP that are associated with a second communication type. The one or more processors are further configured to perform, based on a first data type of first data corresponding to the first communication type and further based on a second data type of second data corresponding to the second communication type, a wireless communication with the base station using the one or more first frequency resources to communicate the first data and using the one or more second frequency resources to communicate the second data.

In some other aspects of the disclosure, an apparatus includes means for receiving, from a base station, control information indicating one or more first frequency resources of a BWP that are associated with a first communication type and further indicating one or more second frequency resources of the BWP that are associated with a second communication type. The apparatus further includes means for performing, based on a first data type of first data corresponding to the first communication type and further based on a second data type of second data corresponding to the second communication type, a wireless communication with the base station using the one or more first frequency resources to communicate the first data and using the one or more second frequency resources to communicate the second data.

In some other aspects of the disclosure, a non-transitory computer-readable medium stores instructions executable by a processor to perform operations. The operations include receiving, from a base station, control information indicating one or more first frequency resources of a BWP that are associated with a first communication type and further indicating one or more second frequency resources of the BWP that are associated with a second communication type. The operations further include performing, based on a first data type of first data corresponding to the first communication type and further based on a second data type of second data corresponding to the second communication type, a wireless communication with the base station using the one or more first frequency resources to communicate the first data and using the one or more second frequency resources to communicate the second data.

In some other aspects of the disclosure, a method of wireless communication includes transmitting, to a UE by a base station, control information indicating one or more first frequency resources of a BWP that are associated with a first communication type and further indicating one or more second frequency resources of the BWP that are associated with a second communication type. The method further includes, based on a first data type of first data corresponding to the first communication type and further based on a second data type of second data corresponding to the second communication type, performing a wireless communication with the UE using the one or more first frequency resources to communicate the first data and using the one or more second frequency resources to communicate the second data.

In some other aspects of the disclosure, an apparatus includes a memory and one or more processors coupled to the memory. The one or more processors are configured to transmit, to a UE, control information indicating one or more first frequency resources of a BWP that are associated with a first communication type and further indicating one or more second frequency resources of the BWP that are associated with a second communication type. The one or more processors are further configured to perform, based on a first data type of first data corresponding to the first communication type and further based on a second data type of second data corresponding to the second communication type, a wireless communication with the UE using the one or more first frequency resources to communicate the first data and using the one or more second frequency resources to communicate the second data.

In some other aspects of the disclosure, an apparatus includes means for transmitting, to a UE, control information indicating one or more first frequency resources of a BWP that are associated with a first communication type and further indicating one or more second frequency resources of the BWP that are associated with a second communication type. The apparatus further includes means for performing, based on a first data type of first data corresponding to the first communication type and further based on a second data type of second data corresponding to the second communication type, a wireless communication with the UE using the one or more first frequency resources to communicate the first data and using the one or more second frequency resources to communicate the second data.

In some other aspects of the disclosure, a non-transitory computer-readable medium stores instructions executable by a processor to perform operations. The operations include transmitting, to a UE, control information indicating one or more first frequency resources of a BWP that are associated with a first communication type and further indicating one or more second frequency resources of the BWP that are associated with a second communication type. The operations further include, based on a first data type of first data corresponding to the first communication type and further based on a second data type of second data corresponding to the second communication type, performing a wireless communication with the UE using the one or more first frequency resources to communicate the first data and using the one or more second frequency resources to communicate the second data.

The foregoing has outlined rather broadly certain features and technical advantages of some examples according to the disclosure in order that the detailed description that follows may be better understood. Additional features and advantages may be described hereinafter. The specific examples disclosed may be utilized as a basis for modifying or designing other structures for carrying out one or more purposes of the present disclosure. Such examples do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also include additional components and features for implementation and practice of claimed and described embodiments. For example, transmission and reception of wireless signals may use a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
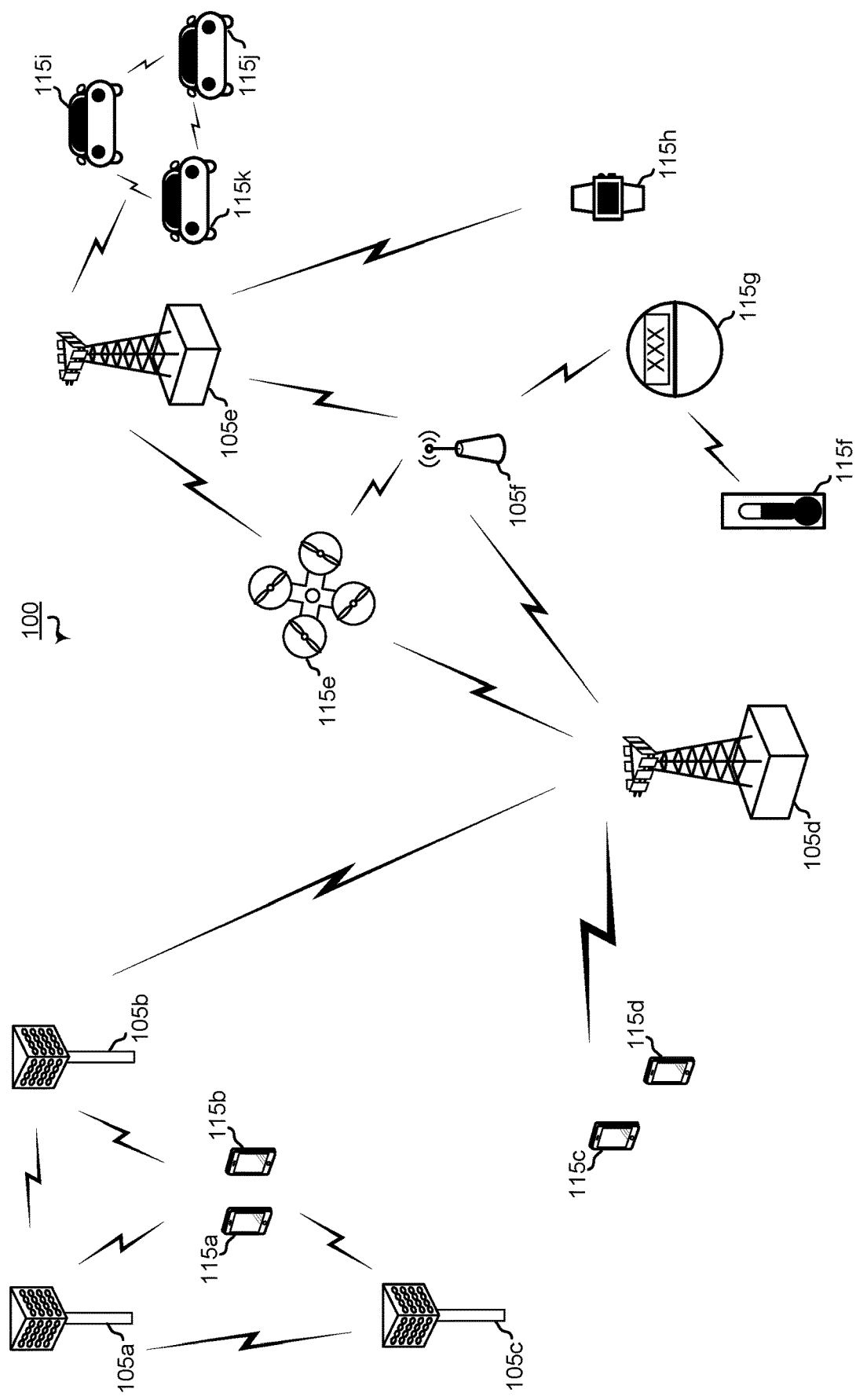
FIG. 1 is a block diagram illustrating an example of a wireless communication system according to some aspects of the disclosure.

A wireless communication system in accordance with some aspects of the disclosure allocates frequency resources of a bandwidth part (BWP) based on different communication types. To illustrate, one or more first frequency resources of the BWP may be allocated to enhanced mobile broadband (eMBB) communications, and one or more second frequency resources of the BWP may be allocated to ultra-reliable low-latency communications (URLLC) communications (or vice versa). One or more parameters associated with the first frequency resources may be set independently of one or more parameters associated with the second frequency resources. For example, a first ratio of uplink slots to downlink slots for the eMBB communications may differ from a second ratio of uplink slots to downlink slots for the URLLC communications.

In some examples, one or both of a user equipment (UE) or a base station may dynamically determine or change one or more parameters of the resource allocation during operation of the wireless communication system. For example, the UE may request allocation (or deallocation) of resources to a particular communication type in response to executing (or ceasing to execute) a particular application associated with the particular communication type. As another example, the base station may allocate (or deallocate) resources to the UE based on a first allocation of resources to one or more other UEs in communication with the base station, based on a second allocation of resources to one or more other UEs in communication with a second base station, or both. To illustrate, the base station may allocate resources to the UE in a manner that reduces or minimizes intra-cell interference within a coverage range associated with the base station. Alternatively or in addition, the base station may allocate resources to the UE in a manner that reduces or minimizes inter-cell interference between the base station and the second base station.

By allocating frequency resources of the BWP to different communication types, performance may be improved as compared to certain other resource allocation techniques. To illustrate, certain conventional techniques allocate resources in the time domain, such as by allocating an entire BWP on a per-slot basis or on a per-symbol basis. In some cases, such time domain resource allocation may be inefficient, such as for communication types associated with different performance metrics. For example, performance of eMBB communications may be enhanced using more slots for downlink communications as compared to URLLC communications (e.g., to increase data download speeds), and performance of URLLC communications may be enhanced using more rapid switching between uplink and downlink slots as compared to eMBB communications (e.g., to enable faster hybrid automatic repeat request (HARQ) performance). Thus, by allocating frequency resources of the BWP on a per-communication type basis, performance may be enhanced.

To further illustrate, aspects of the disclosure may be used for wireless communication networks, such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/k^2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating aspects and features may also include additional components and features.

FIG. 1 shows wireless network 100 for communication according to some aspects. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not have a capability to move, and may be stationary. Some non-limiting examples of one or more of UEs 115 include a mobile phone, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the example illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

In some implementations, wireless network 100 may support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
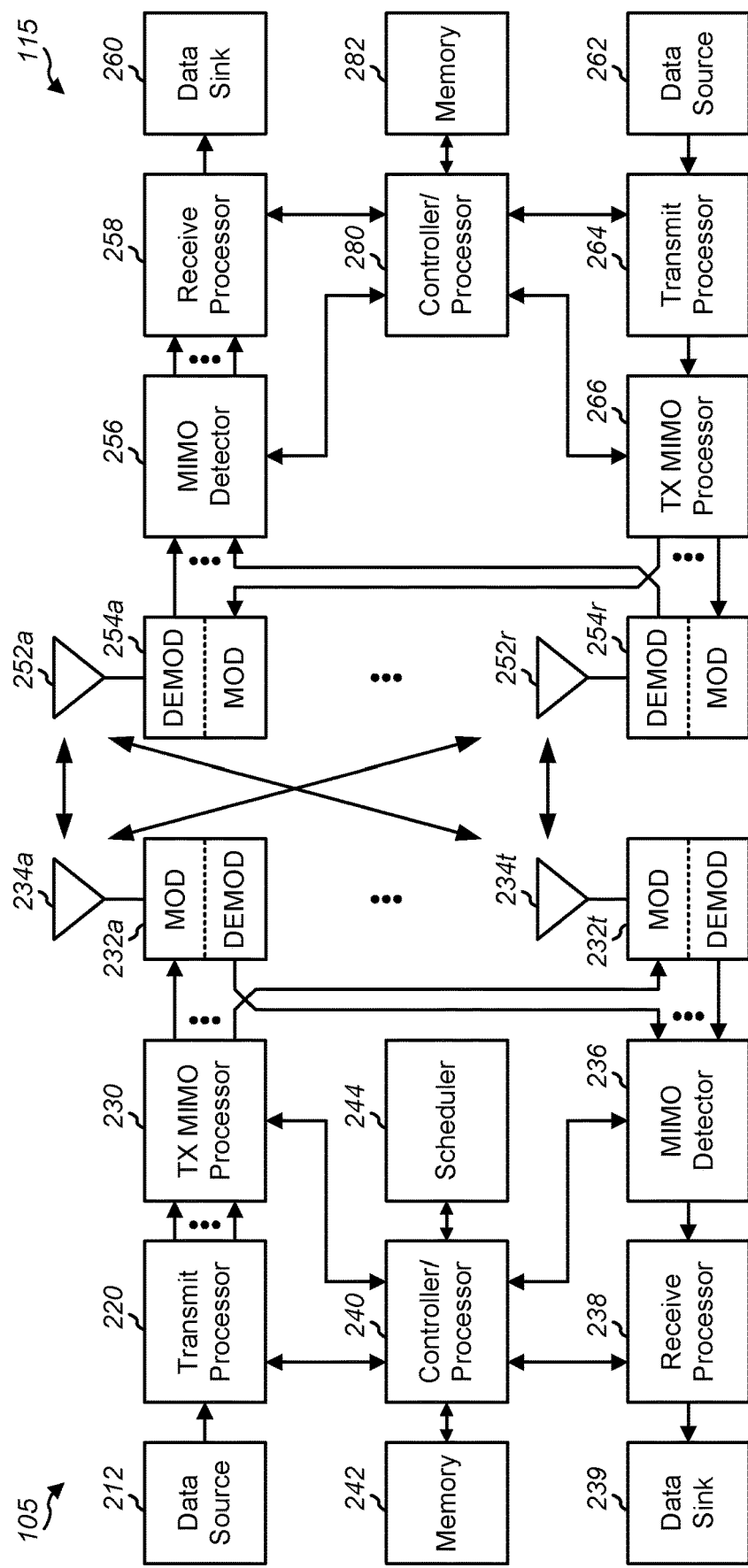
FIG. 2 is a block diagram illustrating an example of a base station and a UE according to some aspects of the disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280.

On the uplink, at UE 115, transmit processor 264 may receive and process data (e.g., for the physical uplink shared channel (PUSCH)) from data source 262 and control information (e.g., for the physical uplink control channel (PUCCH)) from processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to processor 240.

Processors 240 and 280 may direct the operation at base station 105 and UE 115, respectively. Processor 240 and/or other processors and modules at base station 105 and/or processor 280 and/or other processors and modules at UE 115 may perform or direct the execution of various processes for the techniques described herein, such as to perform or direct the operations illustrated in FIGS. 5 and 6.

Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
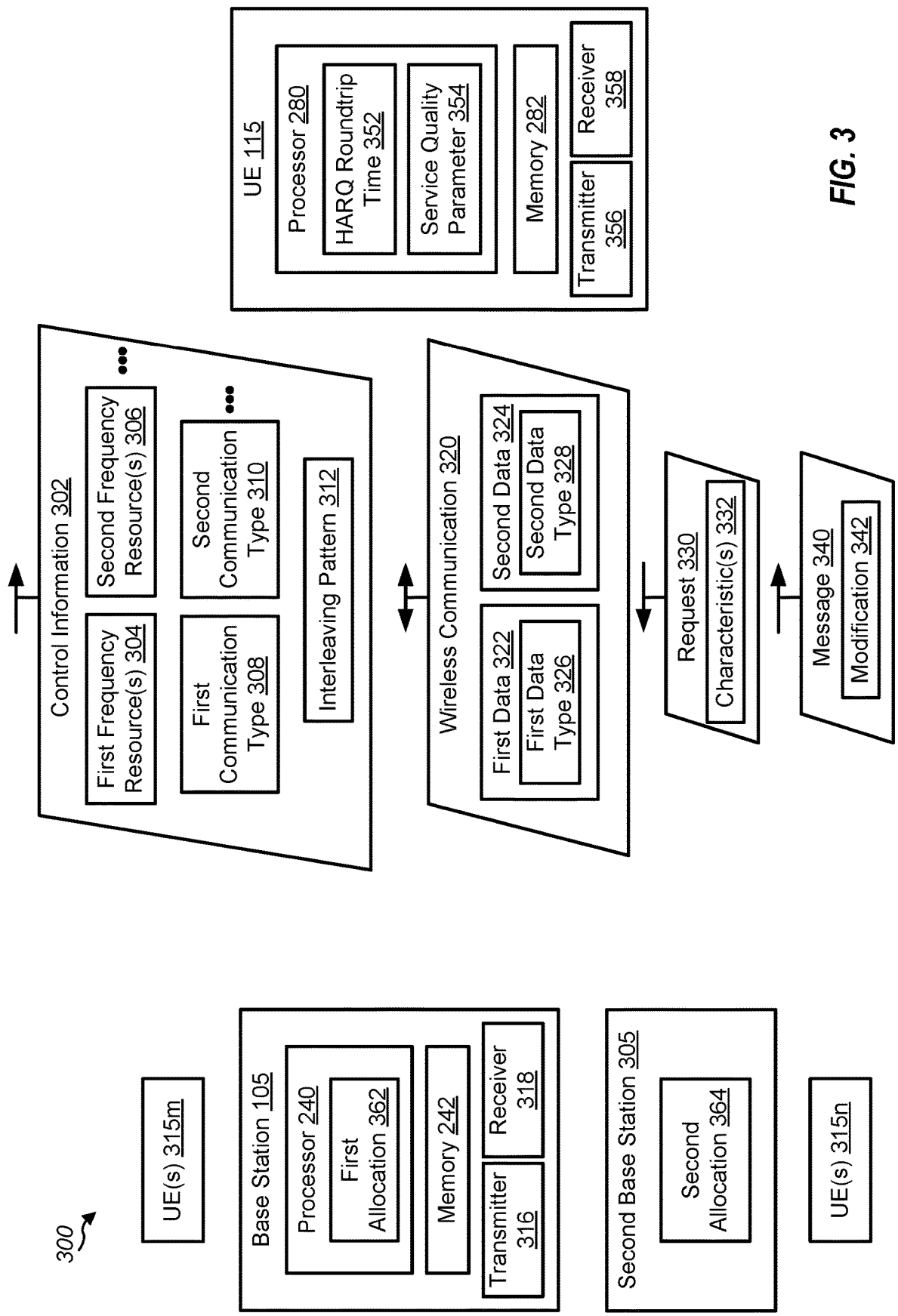
FIG. 3 is a block diagram illustrating an example of a wireless communication system according to some aspects of the disclosure.

FIG. 3 is a block diagram illustrating an example of a wireless communication system 300 according to some aspects of the disclosure. The wireless communication system 300 may include one or more base stations, such as the base station 105 and a second base station 305. The wireless communication system 300 may include one or more UEs, such as the UE 115, one or more UEs 315m, and one or more UEs 315n. In some examples, the UEs 115 and 315m are in communication with the base station 105, and the one or more UEs 315n are in communication with the second base station 305. In other examples, the wireless communication system 300 may include a different number of base stations, a different number of UEs, or both. In some examples, one or more features or operations of the second base station 305 are as described with reference to the base station 105 (e.g., as depicted in the example of FIG. 2), and one or more features or operations of UEs 315m-n are as described with reference to the UE 115 (e.g., as illustrated in the example of FIG. 2).

A device illustrated in FIG. 3 may include one or more processors, a memory, a transmitter, a receiver, one or more other components, or a combination thereof. To illustrate, the base station 105 may include the processor 240, the memory 242, a transmitter 316, and a receiver 318. The processor 240 may be coupled to the memory 242, to the transmitter 316, and to the receiver 318. In some examples, the transmitter 316 and the receiver 318 include one or more components described with reference to FIG. 2, such as one or more of the modulator/demodulators 232a-t, the MIMO detector 236, the receive processor 238, the transmit processor 220, or the TX MIMO processor 230.

The transmitter 316 may transmit reference signals, synchronization signals, control information, and data to one or more other devices, and the receiver 318 may receive reference signals, control information, and data from one or more other devices. For example, the transmitter 316 may transmit signaling, control information, and data to the first UE 115x, and the receiver 318 may receive signaling, control information, and data from the first UE 115x. In some implementations, the transmitter 316 and the receiver 318 may be integrated in one or more transceivers of the base station 105.

To further illustrate, the UE 115 may include one or more processors (such as the processor 280), a memory (such as the memory 282), a transmitter 356, and a receiver 358. In some examples, the transmitter 356 and the receiver 358 may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may transmit reference signals, synchronization signals, control information, and data to one or more other devices, and the receiver 358 may receive reference signals, control information, and data from one or more other devices. For example, in some implementations, the transmitter 356 may transmit signaling, control information, and data to the base station 105, and the receiver 358 may receive signaling, control information, and data from the base station 105.

In some implementations, one or more of the transmitter 316, the receiver 318, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

During operation, the base station 105 may send control information 302 to the UE 115. The control information 302 may indicate one or more first frequency resources 304 of a bandwidth part (BWP) and one or more second frequency resources 306 of the BWP. In some examples, the one or more first frequency resources 304 include a first set of one or more physical resource blocks (PRBs), and the one or more second frequency resources 306 include a second set of one or more PRBs that is different than the first set. The one or more first frequency resources 304 are associated with a first communication type 308, and the one or more second frequency resources 306 are associated with a second communication type. In some examples, the control information 302 may optionally indicate an interleaving pattern 312.

To illustrate, in some examples, the first communication type 308 corresponds to one of an enhanced mobile broadband (eMBB) communication type or an ultra-reliable low-latency communications (URLLC) communication type, and the second communication type 310 corresponds to the other of the eMBB communication type or the URLLC communication type. In other examples, one or both of the communication types 308, 310 may correspond to another communication type. Further, in some examples, the control information 302 indicates more than two sets of resources, more than two communication types, or both. In some aspects, a communication type may also be referred to as a service type or as an application type.

In some examples, the base station 105 sends data of the control information 302 to the UE 115 via a radio resource control (RRC) message. Alternatively or in addition, the base station 105 may send data of the control information 302 to the UE 115 via a medium access control (MAC) control element (MAC-CE), via downlink control information (DCI), or both. Alternatively or in addition, the base station 105 may send data of the control information 302 to the UE 115 using one or more other techniques.

The base station 105 and the UE 115 may be configured to perform a wireless communication 320 based on the control information 302. In some examples, performing the wireless communication 320 includes communicating first data 322 using the one or more first frequency resources 304 and based on a first data type 326 of the first data 322 corresponding to the first communication type 308. Performing the wireless communication 320 may further include communicating second data 324 using the one or more second frequency resources 306 and based on a second data type 328 of the second data 324 corresponding to the second communication type 310. As referred to herein, communicating the first data 322 may include transmitting, by the base station 105 to the UE 115, the first data 322 or transmitting, by the UE 115 to the base station 105, the first data 322. Communicating the second data 324 may include transmitting, by the base station 105 to the UE 115, the second data 324 or transmitting, by the UE 115 to the base station 105, the second data 324.

For example, the base station 105 or the UE 115 may execute a first application associated with the first data 322 (e.g., to generate the first data 322). The first application may specify the first data type 326 of the first data 322. For example, if the first application involves a relatively large broadband spectrum for communications, then the first application may generate an indication of the first data type 326 in the first data 322. To illustrate, in some implementations, the first application may correspond to a large-scale video streaming application, an augmented reality (AR) application, or a virtual reality (VR) application, or another application that involves a relatively large broadband spectrum for communications. Based on the first data type 326, the base station 105 or the UE 115 may detect that the first data 322 corresponds to the first communication type 308 (e.g., an eMBB communication type, as an illustrative example).

As another example, the base station 105 or the UE 115 may execute a second application associated with the second data 324 (e.g., to generate the second data 324). The second application may specify the second data type 328 of the second data 324. For example, if the second application involves a relatively low latency for data communications, then the second application may generate an indication of the second data type 328 in the second data 324. To illustrate, in some implementations, the second application may be executed to control a robot, an autonomous vehicle, or a tool (e.g., a surgical instrument), or another device that is relatively sensitive to latency of data communications. Based on the second data type 328, the base station 105 or the UE 115 may detect that the second data 324 corresponds to the second communication type 310 (e.g., URLLC communication type, as an illustrative example).

Thus, in some implementations, the first communication type 308 may correspond to an eMBB communication type, and the second communication type 310 may correspond to a URLLC communication type. In some other examples, the first communication type 308 may correspond to a URLLC communication type, and the second communication type 310 may correspond to an eMBB communication type. In some examples, one of the communication types 308, 310 is associated with a first part of a frequency spectrum (e.g., a first number of frequencies within the frequency spectrum) that is different than (e.g., greater than or less than) a second part of the frequency spectrum (e.g., a second number of frequencies within the frequency spectrum) associated with the other of the communication types 308, 310. In some examples, one of the communication types 308, 310 is associated with a first latency sensitivity that is greater than a second latency sensitivity associated with the other of the communication types 308, 310.

Further, although eMBB and URLLC communication types have been described with illustration, in other implementations, one or more other communication types may be used (alternatively or in addition to the eMBB and URLLC communication types). For example, another example of a communication type is a massive machine type communications (mMTC) communication type. In this case, one of the communication types 308, 310 may correspond to an mMTC communication type.

Figure 4:
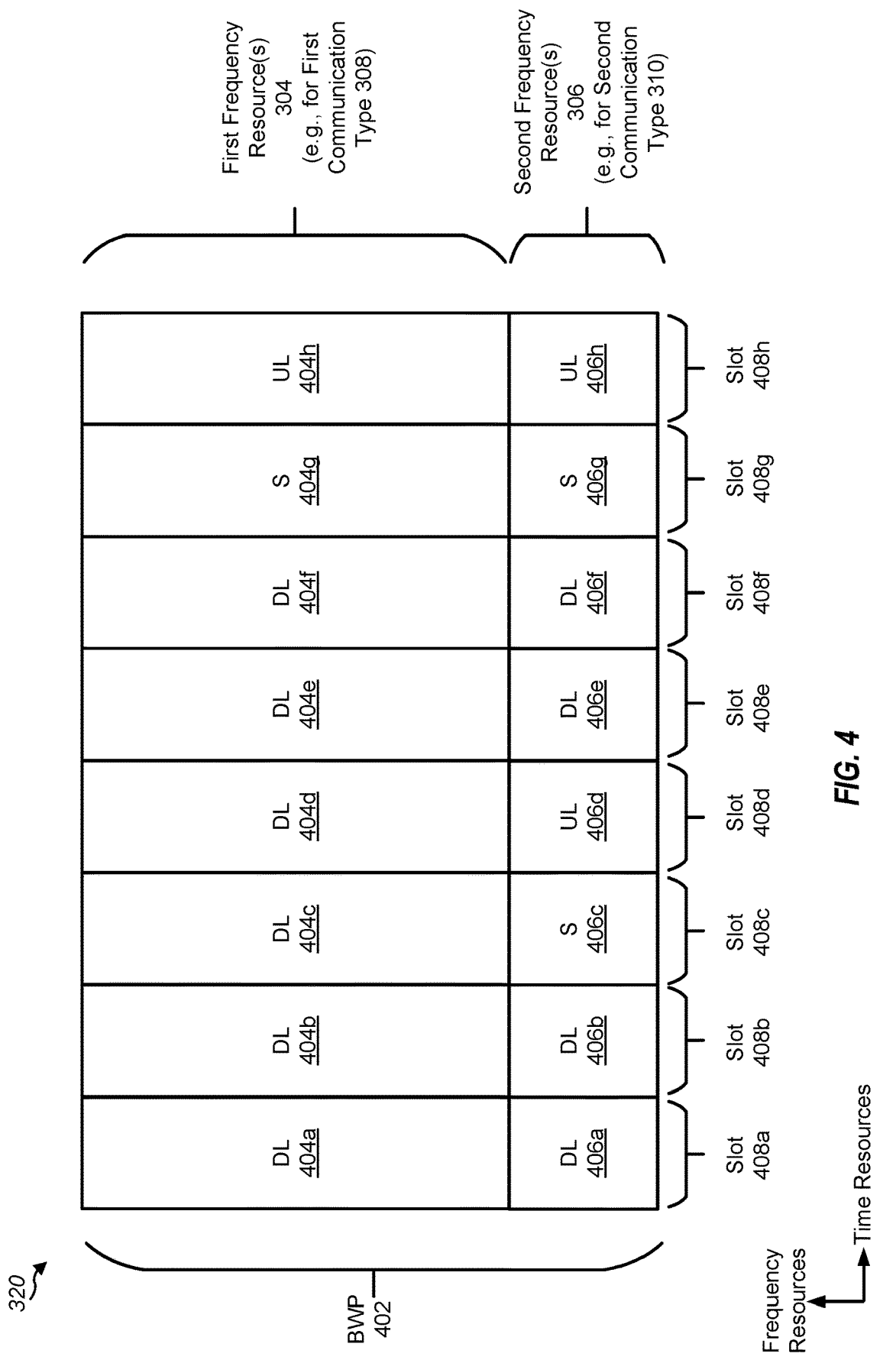
FIG. 4 is a block diagram of certain aspects of a resource grid that may be associated with a wireless communication of the wireless communication system of FIG. 3 according to some aspects of the disclosure.

To further illustrate, FIG. 4 is a block diagram of certain aspects of a resource grid that may be associated with the wireless communication 320 of FIG. 3. One or more features depicted in FIG. 4 may be specified by the control information 302 of FIG. 3.

In the example of FIG. 4, a BWP 402 is associated with the one or more first frequency resources 304 and the one or more second frequency resources 306. The one or more first frequency resources 304 may include resources 404*a-h*, and the one or more second frequency resources 306 may include resources 406*a-h*. Each resource 404*a-h* and 406*a-h* may be associated with downlink (DL) communication, uplink (UL) communication, or switching (S) between downlink and uplink communication. The wireless communication 320 may further be associated with slots 408*a-h*. Although slots are described with reference to FIG. 4, in some other examples, the slots 408*a-h* of FIG. 4 correspond to symbols, such as OFDM symbols.

In some examples, the control information 302 of FIG. 3 indicates one or more of a first slot (e.g., any of the slots 408*a-f*) for a downlink communication of the first communication type 308, a second slot (e.g., the slot 408*h*) for an uplink communication of the first communication type 308, or a third slot (e.g., the slot 408*g*) corresponding to a gap between the first slot and the second slot. The control information 302 may indicate one or more of a first slot (e.g., any of the slots 408*a-b* and 408*e-f*) for a downlink communication of the second communication type 310, a second slot (e.g., the slot 408*d* or the slot 408*h*) for an uplink communication of the second communication type 310, or a third slot (e.g., the slot 408*c* or the slot 408*g*) corresponding to a gap between the first slot and the second slot.

In some implementations, the first communication type 308 is associated with a first ratio of slots for downlink communications to slots for uplink communications. To illustrate, in the example of FIG. 4, the first ratio corresponds to 6-to-1 (e.g., because the slots 408*a-f* are associated with downlink communications of the first communication type 308, and the slot 404*h* is associated with uplink communication of the first communication type 308). The second communication type 310 may be associated with a second ratio of slots for downlink communications to slots for uplink communications. Depending on the particular example, the second ratio may be the same as or may be different than the first ratio. In some examples, the second ratio is less than the first ratio (e.g., to reduce communication latency associated with the second communication type 310). To further illustrate, in the example of FIG. 4, the second ratio corresponds to 2-to-1 (e.g., because the slots 406*a-b* are associated with downlink communications, and the slot 408*d* is associated with uplink communication). In some examples, the first ratio may be referred to a first switching ratio, and the second ratio may be referred to a second switching ratio.

In some examples, one or more aspects of the resource grid of FIG. 4 may be interleaved based on the interleaving pattern 312 of FIG. 3. To illustrate, the interleaving pattern 312 may indicate that an assignment of the first communication type 308 to one or more slots may be interleaved with the second communication type 310. As an example, the interleaving pattern 312 may indicate that, during the slots 408*a-d*, the one or more first frequency resources 304 are assigned to communications of the first communication type 308 and that, during the slots 408*a-d*, the one or more second frequency resources 306 are assigned to communications of the second communication type 310. The interleaving pattern 312 may further specify at least one slot for which the first communication type 308 is associated with the one or more second frequency resources 306 and for which the second communication type 310 is associated with the one or more first frequency resources 304. To illustrate, the interleaving pattern 312 may indicate that, during the slots 408*e-h*, the one or more first frequency resources 304 are assigned to communications of the second communication type 310 and that, during the slots 408*e-h*, the one or more second frequency resources 306 are assigned to communications of the first communication type 308. In this illustrative example, communications of the first communication type 308 are interleaved with communications of the second communication type 310 across the slots 408*a-d* and the slots 408*e-h* based on the interleaving pattern 312.

Referring again to FIG. 3, in some implementations, the UE 115 may send a request 330 to the base station 105. The request 330 may indicate one or more characteristics 332 of the control information 302. In some examples, the UE 115 sends the request 330 prior to receiving the control information 302, and the base station 105 may determine the control information 302 at least in part based on the one or more characteristics 332 indicated by the request 330. In some other examples, the UE 115 sends the request 330 to the base station 105 after receiving the control information 302, and the request 330 indicates modification of the control information 302 based on the one or more characteristics 332.

To illustrate, in one example, the request 330 indicates one or more of a first number of the one or more first frequency resources 304 or a first bandwidth of the one or more first frequency resources 304. The request 330 may further indicate one or more of a second number of the one or more second frequency resources 306 or second bandwidth of the one or more second frequency resources 306. Alternatively or in addition, the request 330 may indicate one or more of a first assignment of the one or more first frequency resources 304 to the first communication type 308 or a second assignment of the one or more second frequency resources 306 to the second communication type 310.

Alternatively or in addition, the request 330 may indicate one or more of a first ratio associated with the first communication type 308 or a second ratio associated with the second communication type 310. The first ratio may be based on one or more first slots for a downlink communication of the first communication type 308, one or more second slots for an uplink communication of the first communication type 308, one or more third slots corresponding to a gap between the one or more first slots and the one or more second slots, or a combination thereof. The second ratio may be based on one or more first slots for a downlink communication of the second communication type 310, one or more second slots for an uplink communication of the second communication type 310, one or more third slots corresponding to a gap between the one or more first slots and the one or more second slots, or a combination thereof. In some examples, the request 330 indicates one or more of the first ratio or the second ratio described with reference to FIG. 4. As an illustrative example, the request 330 may indicate a first ratio of 6-to-1, a second ratio of 2-to-1, or both. In other examples, different ratios may be used.

Alternatively or in addition, in some examples, the request 330 includes an indication of a period during which resources are to be available (e.g., on a temporary basis) to the UE 115. The request 330 may indicate the period using a temporal indication (such as a number of slots or symbols) or using other information, such as a number of transmissions or other operations. For example, the request 330 may indicate one or more of a first duration during which the first assignment of the one or more first frequency resources 304 is valid or a second duration during which the second assignment of the one or more second frequency resources 306 is valid. As another example, the request 330 may indicate one or more of a first number of repetitions (e.g., a first cycle of downlink-switch-uplink slots) for which the first assignment of the one or more first frequency resources 304 is valid or a second number of repetitions (e.g., a second cycle of downlink-switch-uplink slots) for which the second assignment of the one or more second frequency resources 306 is valid. To illustrate, in some examples, FIG. 4 depicts one repetition of the first assignment of the one or more first frequency resources 304 and depicts two repetitions of the second assignment of the one or more second frequency resources 306.

In some examples, the one or more characteristics 332 may be based on one or more of a hybrid automatic repeat request (HARQ) roundtrip time 352 associated with the UE 115 or a service quality parameter 354 (e.g., a service quality "requirement") associated with an application of the UE 115. In some examples, the UE 115 determines one or both of the first ratio or the second ratio based on the HARQ roundtrip time 352, the service quality parameter 354, or both. To illustrate, the HARQ roundtrip time 352 may correspond to a number of slots between a transmission of data by the UE 115 and a retransmission of the data by the UE 115. In this example, the UE 115 may select one or both of the first ratio or the second ratio so that the UE 115 performs other operations during the slots between the transmission and the retransmission (e.g., so that the UE 115 receives downlink communications during the slots, so that the slots include one or more switching slots, or both).

In some examples, the UE 115 sends the request 330 in response to executing a particular application, in response to closing a particular application, or both. To illustrate, in response to loading a particular application from the memory 282 of FIG. 2, the UE 115 may detect that the particular application is associated with the first communication type 308 (or the second communication type 310). In this example, the UE 115 may send the request 330 for allocation of resources to the first communication type 308 (or the second communication type 310). As another example, in response to closing the particular application (and ceasing to execute the particular application), the UE 115 may send the request 330 to deallocate resources to the first communication type 308 (or the second communication type 310). For example, the UE 115 may send the request 330 for the one or more first frequency resources 304 to be reallocated form the first communication type 308 to the second communication type 310. As another example, the UE 115 may send the request 330 for the one or more second frequency resources 306 to be reallocated form the second communication type 310 to the first communication type 308.

Alternatively or in addition, the UE 115 may determine the one or more characteristics 332 based on one or more other criteria, such as the service quality parameter 354. For example, the UE 115 may execute an application that is associated with one or more criteria, such as a threshold data rate, a threshold number of frequency resources, a maximum latency, one or more other criteria, or a combination thereof.

To satisfy the one or more criteria, the UE 115 may request that the control information 302 satisfy the service quality parameter 354.

In some implementations, the UE 115 may receive, from the base station 105, a message 340 indicating a modification 342 of the control information 302. In some examples, the base station 105 sends the message 340 in response to receiving the request 330. In some examples, the message 340 modifies a first pattern of uplink to downlink slots associated with the first communication type or a second pattern of uplink to downlink slots associated with the first communication type. To illustrate, one of the first pattern or the second pattern may correspond to the resource grid illustrated in FIG. 4, and the other of the first pattern or the second pattern may correspond to a resource grid that is different than the example illustrated in FIG. 4, such as a different assignment of resources of the BWP 402 to the communication types 308, 310, a different first ratio, a different second ratio, one or more other parameters, or a combination thereof.

Alternatively or in addition to determining the control information 302 based on the request 330, in some implementations, the base station 105 determines the control information 302 based on at least in part on a first allocation 362 of resources to the one or more UEs 315*m*, such as by using the first allocation 362 to reduce intra-cell interference associated with the wireless communication system 300. To illustrate, the first allocation 362 may indicate resources used by the one or more UEs 115 to communicate with the base station 105. In some cases, the base station 105 may allocate the frequency resources 304, 306 to the UE 115 based on the first allocation 362 indicating that the frequency resources 304, 306 are not allocated to the one or more UEs 315*m*. Alternatively or in addition, the base station 105 may use the first allocation 362 to determine a type of communication for one or more slots indicated by the control information 302. For example, if the first allocation 362 indicates that the slot 408*a* is associated with uplink communication by the one or more UEs 315*m*, then the base station 105 may assign downlink communication to the UE 115 during the slot 408*a*, as illustrated in the example of FIG. 4.

In some examples, the base station 105 "shares" the first allocation 362 with one or more other base stations, such as by transmitting an indication of the first allocation 362 to the second base station 305. In some examples, transmitting the indication of the first allocation 362 enables the base station 105 and the second base station 305 to reduce inter-cell interference between the base station 105 and the second base station 305. Further, in some implementations, the base station 105 receives, from the second base station 305, an indication of a second allocation 364 of resources to one or more UEs 315*n* in communication with the second base station 305.

To further illustrate, alternatively or in addition to determining the control information 302 based on one or more of the request 330 or the first allocation 362, in some implementations, the base station 105 determines the control information 302 based on at least in part on the second allocation 364, such as by using the second allocation 364 to reduce inter-cell interference associated with the wireless communication system 300. To illustrate, the first allocation 362 may indicate resources used by the one or more UEs 315*n* to communicate with the second base station 305. In some cases, the base station 105 may allocate the frequency resources 304, 306 to the UE 115 based on the second allocation 364 indicating that the frequency resources 304, 306 are not allocated to the one or more UEs 315*n*. Alternatively or in addition, the base station 105 may use the second allocation 364 to determine a type of communication for one or more slots indicated by the control information 302. For example, if the second allocation 364 indicates that the slot 408*a* is associated with uplink communication by the one or more UEs 315*n*, then the base station 105 may assign downlink communication to the UE 115 during the slot 408*a*, as illustrated in the example of FIG. 4.

One or more aspects described with reference to FIGS. 3 and 4 may improve performance of a wireless communication system 300. For example, by allocating frequency resources of the BWP 402 to different communication types, performance may be improved as compared to certain other techniques that allocate resources in the time domain, such as by allocating resources to different communication types for an entire BWP on a per-slot basis or on a per-symbol basis. In some examples, performance of eMBB communications may be enhanced using more slots for downlink communications as compared to URLLC communications (e.g., to increase data download speeds), and performance of URLLC communications may be enhanced using more rapid switching between uplink and downlink slots as compared to eMBB communications (e.g., to enable faster hybrid automatic repeat request (HARQ) performance). Thus, by allocating frequency resources of the BWP 402 on a per-communication type basis, performance may be enhanced.

Figures 5, 6:
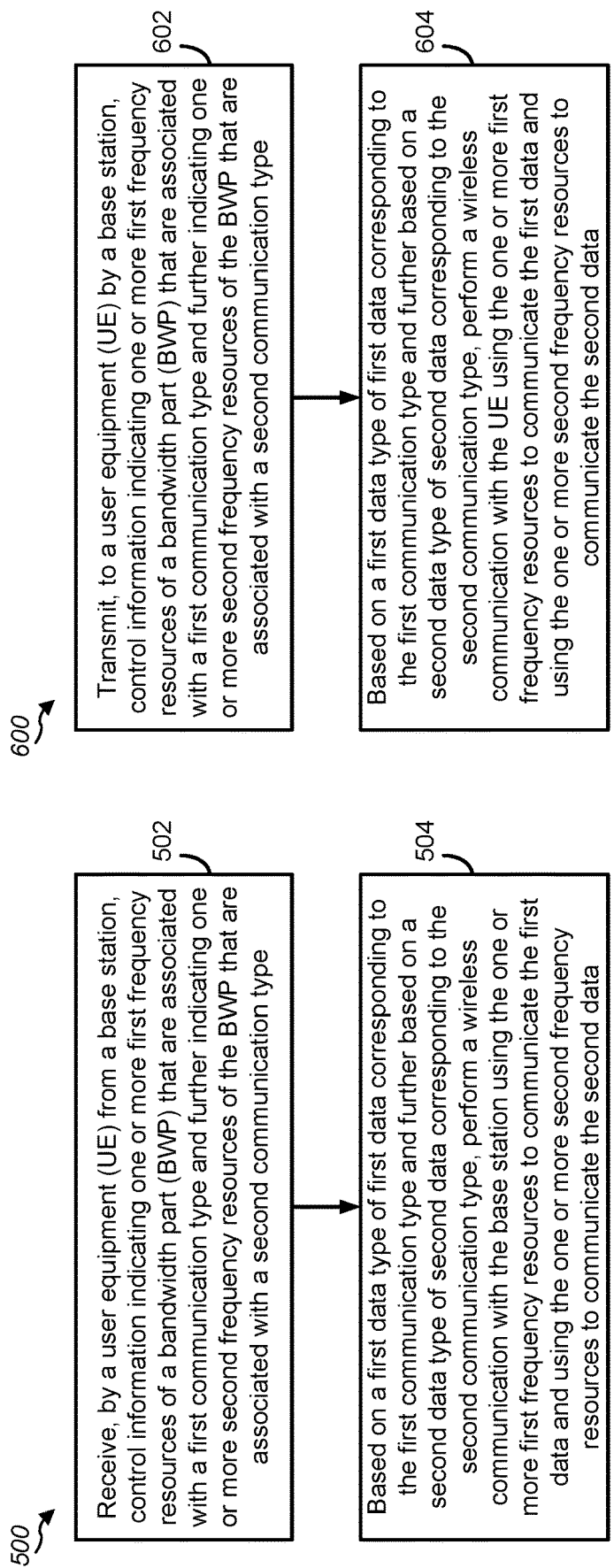
FIG. 5 is a flow chart of an example of a method of operation of a UE according to some aspects of the disclosure.
FIG. 6 is a flow chart of an example of a method of operation of a base station according to some aspects of the disclosure.

FIG. 5 is a flow chart of an example of a method 500 of operation of a UE according to some aspects of the disclosure. In some examples, the UE 115 performs the method 500. In some implementations, the processor 280 is configured to initiate, perform, or control one or more operations of the method 500.

The method 500 includes receiving control information by a UE from a base station, at 502. The control information indicates one or more first frequency resources of a BWP that are associated with a first communication type and further indicates one or more second frequency resources of the BWP that are associated with a second communication type. To illustrate, the UE 115 may receive the control information 302 from the base station 105. For example the receiver 358 may be configured to receive the control information 302. The control information 302 may indicate the one or more first frequency resources 304 of the BWP 402 and may further indicate the one or more second frequency resources 306 of the BWP 402. The one or more first frequency resources 304 may be associated with the first communication type 308, and the one or more second frequency resources 306 may be associated with the second communication type 310.

The method 500 further includes, based on a first data type of first data corresponding to the first communication type and further based on a second data type of second data corresponding to the second communication type, performing a wireless communication with the base station using the one or more first frequency resources to communicate the first data and using the one or more second frequency resources to communicate the second data, at 504. For example, the UE 115 may perform the wireless communication 320 by transmitting or receiving the first data 322 via the one or more first frequency resources 304 based on the first data type 326 corresponding to the first communication type 308. In this example, the transmitter 356 may be configured to perform the wireless communication 320. As another example, the UE 115 may perform the wireless communication 320 by transmitting or receiving the second data 324 via the one or more second frequency resources 306 based on the second data type 328 corresponding to the second communication type 310. In this example, the receiver 358 may be configured to perform the wireless communication 320.

FIG. 6 is a flow chart of an example of a method 600 of operation of a base station according to some aspects of the disclosure. In some examples, the base station 105 performs the method 600. In some implementations, the processor 240 is configured to initiate, perform, or control one or more operations of the method 600.

The method 600 includes transmitting, to a UE by a base station, control information indicating one or more first frequency resources of a BWP that are associated with a first communication type and further indicating one or more second frequency resources of the BWP that are associated with a second communication type, at 602. To illustrate, the base station 105 may send the control information 302 to the UE 115. For example, the transmitter 316 may be configured to transmit the control information 302 to the UE 115. The control information 302 may indicate the one or more first frequency resources 304 of the BWP 402 and may further indicate the one or more second frequency resources 306 of the BWP 402. The one or more first frequency resources 304 may be associated with the first communication type 308, and the one or more second frequency resources 306 may be associated with the second communication type 310.

The method 600 further includes, based on a first data type of first data corresponding to the first communication type and further based on a second data type of second data corresponding to the second communication type, performing a wireless communication with the UE using the one or more first frequency resources to communicate the first data and using the one or more second frequency resources to communicate the second data, at 604. For example, the base station 105 may perform the wireless communication 320 by transmitting or receiving the first data 322 via the one or more first frequency resources 304 based on the first data type 326 corresponding to the first communication type 308. As another example, the base station 105 may perform the wireless communication 320 by transmitting or receiving the second data 324 via the one or more second frequency resources 306 based on the second data type 328 corresponding to the second communication type 310. In some examples, one or more of the transmitter 316 or the receiver 318 are configured to perform the wireless communication 320.

Figure 7:
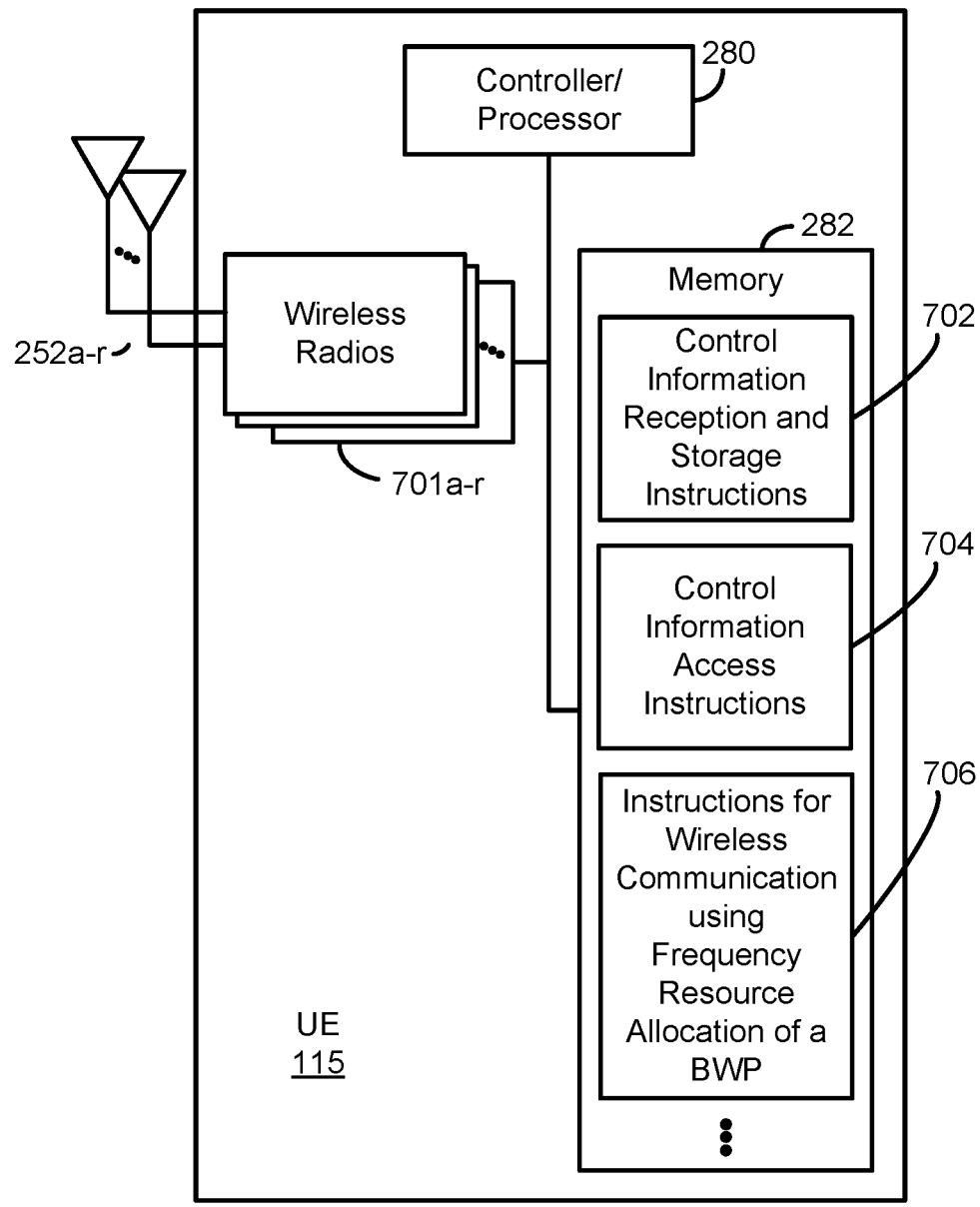
FIG. 7 is a block diagram illustrating an example of a UE according to some aspects of the disclosure.

FIG. 7 is a block diagram illustrating an example of the UE 115 according to some aspects of the disclosure. The UE 115 may include one or more components described with reference to FIG. 2. For example, the UE 115 includes the processor 280 and the memory 282. The UE 115, under control of the processor 280, transmits and receives signals via wireless radios 701a-r and the antennas 252a-r. The wireless radios 701a-r may include one or more components of FIG. 2, such as one or more of the modulator/demodulators 254a-r, the MIMO detector 256, the receive processor 258, the transmit processor 264, or the TX MIMO processor 266.

The memory 282 is configured to store instructions executable by the processor 280 to perform, initiate, or control one or more operations described herein. To illustrate, in FIG. 7, the memory 282 stores control information reception and storage instructions 702. The processor 280 may execute the control information reception and storage instructions 702 to receive the control information 302 from the base station 105 and to store the control information 302 to a memory, such as the memory 282. FIG. 7 also illustrates that the memory 282 may store control information access instructions 704 executable by the processor 280 to access the control information 302 to determine one or more parameters for a wireless communication, such as the wireless communication 320. The memory 282 may store instructions 706 for a wireless communication using frequency resource allocation of a BWP. The instructions 706 may be executable by the processor 280 to perform the wireless communication 320 based on one or more parameters indicated by the control information 302.

Figure 8:
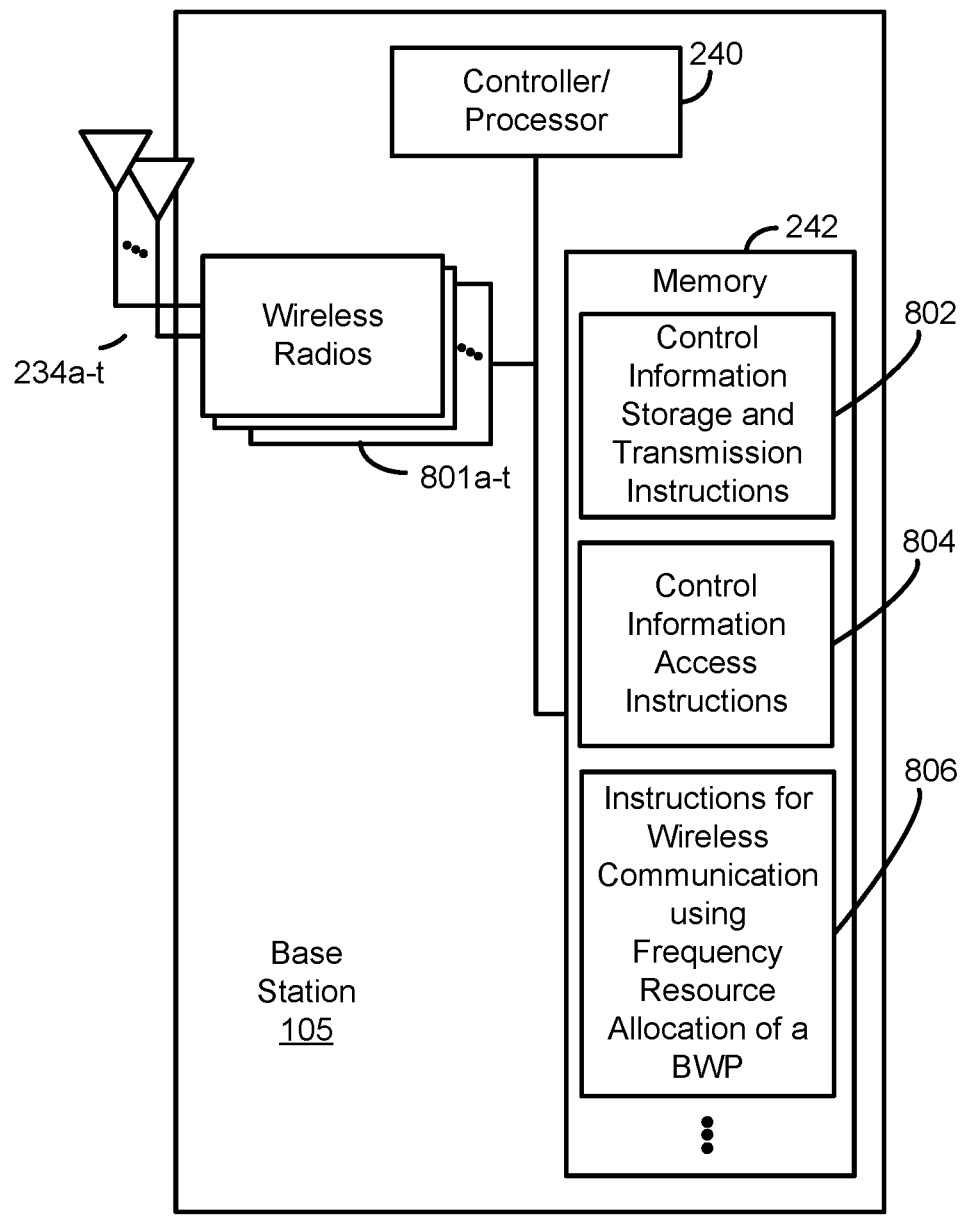
FIG. 8 is a block diagram illustrating an example of a base station according to some aspects of the disclosure.

FIG. 8 is a block diagram illustrating an example of a base station according to some aspects of the disclosure. The base station 105 may include one or more components described with reference to FIG. 2. For example, the base station 105 includes the processor 240 and the memory 242. The base station 105, under control of the processor 240, transmits and receives signals via wireless radios 801a-t and the antennas 234a-t. The wireless radios 801a-t may include one or more components of FIG. 2, such as one or more of the modulator/demodulators 232a-t, the MIMO detector 236, the receive processor 238, the transmit processor 220, or the TX MIMO processor 230.

The memory 242 is configured to store instructions executable by the processor 240 to perform, initiate, or control one or more operations described herein. To illustrate, in FIG. 8, the memory 242 stores control information storage and transmission instructions 802. The processor 240 may execute the control information storage and transmission instructions 802 to store the control information 302 to a memory, such as the memory 242, and to transmit the control information 302, such as to the UE 115. FIG. 8 also illustrates that the memory 242 may store control information access instructions 804 executable by the processor 240 to access the control information 302 to determine one or more parameters for a wireless communication, such as the wireless communication 320. The memory 242 may store instructions 806 for a wireless communication using frequency resource allocation of a BWP. The instructions 806 may be executable by the processor 240 to perform the wireless communication 320 based on one or more parameters indicated by the control information 302.

In a first aspect, a method of wireless communication includes receiving control information by a UE from a base station. The control information indicates one or more first frequency resources of a BWP that are associated with a first communication type and further indicates one or more second frequency resources of the BWP that are associated with a second communication type. The method further includes, based on a first data type of first data corresponding to the first communication type and further based on a second data type of second data corresponding to the second communication type, performing a wireless communication with the base station using the one or more first frequency resources to communicate the first data and using the one or more second frequency resources to communicate the second data.

In a second aspect, alone or in combination with the first aspect, one of the first communication type or the second communication type is associated with a first part of a frequency spectrum that is different than a second part of the frequency spectrum associated with the other of the first communication type or the second communication type.

In a third aspect, alone or in combination with one or more of the first through second aspects, one of the first communication type or the second communication type is associated with a first latency sensitivity that is greater than a second latency sensitivity associated with the other of the first communication type or the second communication type.

In a fourth aspect, alone or in combination with one or more of the first through third aspects, the first communication type corresponds to one of an eMBB communication type or a URLLC communication type, and the second communication type corresponds to the other of the eMBB communication type or the URLLC communication type.

In a fifth aspect, alone or in combination with one or more of the first through fourth aspects, the control information indicates one or more first slots for a downlink communication of the first communication type, one or more second slots for an uplink communication of the first communication type, one or more third slots corresponding to a gap between the one or more first slots and the one or more second slots, or a combination thereof.

In a sixth aspect, alone or in combination with one or more of the first through fifth aspects, the control information indicates one or more first slots for a downlink communication of the second communication type, one or more second slots for an uplink communication of the second communication type, one or more third slots corresponding to a gap between the one or more first slots and the one or more second slots, or a combination thereof.

In a seventh aspect, alone or in combination with one or more of the first through sixth aspects, the control information is received by the UE via an RRC message from the base station, via a MAC-CE from the base station, or via DCI from the base station.

In an eighth aspect, alone or in combination with one or more of the first through seventh aspects, the method further includes receiving, from the base station, a message modifying one or more of a first pattern of uplink to downlink slots associated with the first communication type or a second pattern of uplink to downlink slots associated with the first communication type.

In a ninth aspect, alone or in combination with one or more of the first through eighth aspects, the control information further indicates an interleaving pattern, and the interleaving pattern specifies at least one slot for which the first communication type is associated with the one or more second frequency resources and for which the second communication type is associated with the one or more first frequency resources.

In a tenth aspect, alone or in combination with one or more of the first through ninth aspects, the method further includes sending a request to the base station, where the request indicates one or more characteristics of the control information.

In an eleventh aspect, alone or in combination with one or more of the first through tenth aspects, the request indicates one or more of: a first number of the one or more first frequency resources; a second number of the one or more second frequency resources; a first assignment of the one or more first frequency resources to the first communication type; a second assignment of the one or more second frequency resources to the second communication type; a first bandwidth of the one or more first frequency resources; a second bandwidth of the one or more second frequency resources; a first duration during which the first assignment of the one or more first frequency resources is valid; a second duration during which the second assignment of the one or more second frequency resources is valid; a first number of repetitions for which the first assignment of the one or more first frequency resources is valid; or a second number of repetitions for which the second assignment of the one or more second frequency resources is valid.

In a twelfth aspect, alone or in combination with one or more of the first through eleventh aspects, the request indicates one or more of a first ratio associated with the first communication type or a second ratio associated with the second communication type.

In a thirteenth aspect, alone or in combination with one or more of the first through twelfth aspects, the first ratio is based on one or more first slots for a downlink communication of the first communication type, one or more second slots for an uplink communication of the first communication type, one or more third slots corresponding to a gap between the one or more first slots and the one or more second slots, or a combination thereof.

In a fourteenth aspect, alone or in combination with one or more of the first through thirteenth aspects, the second ratio is based on one or more first slots for a downlink communication of the second communication type, one or more second slots for an uplink communication of the second communication type, one or more third slots corresponding to a gap between the one or more first slots and the one or more second slots, or a combination thereof.

In a fifteenth aspect, alone or in combination with one or more of the first through fourteenth aspects, the UE selects one or more of the first ratio or the second ratio based on a HARQ roundtrip time associated with the UE or a service quality parameter associated with an application of the UE.

In a sixteenth aspect, the method includes any combination of the first through fifteenth aspects.

In a seventeenth aspect, an apparatus includes a memory and one or more processors coupled to the memory. The one or more processors are configured to receive, from a base station, control information indicating one or more first frequency resources of a BWP that are associated with a first communication type and further indicating one or more second frequency resources of the BWP that are associated with a second communication type. The one or more processors are further configured to perform, based on a first data type of first data corresponding to the first communication type and further based on a second data type of second data corresponding to the second communication type, a wireless communication with the base station using the one or more first frequency resources to communicate the first data and using the one or more second frequency resources to communicate the second data.

In an eighteenth aspect, an apparatus includes means for receiving, from a base station, control information indicating one or more first frequency resources of a BWP that are associated with a first communication type and further indicating one or more second frequency resources of the BWP that are associated with a second communication type. The apparatus further includes means for performing, based on a first data type of first data corresponding to the first communication type and further based on a second data type of second data corresponding to the second communication type, a wireless communication with the base station using the one or more first frequency resources to communicate the first data and using the one or more second frequency resources to communicate the second data.

In a nineteenth aspect, a non-transitory computer-readable medium stores instructions executable by a processor to perform operations. The operations include receiving, from a base station, control information indicating one or more first frequency resources of a BWP that are associated with a first communication type and further indicating one or more second frequency resources of the BWP that are associated with a second communication type. The operations further include performing, based on a first data type of first data corresponding to the first communication type and further based on a second data type of second data corresponding to the second communication type, a wireless communication with the base station using the one or more first frequency resources to communicate the first data and using the one or more second frequency resources to communicate the second data.

In a twentieth aspect, a method of wireless communication includes transmitting, to a UE by a base station, control information indicating one or more first frequency resources of a BWP that are associated with a first communication type and further indicating one or more second frequency resources of the BWP that are associated with a second communication type. The method further includes, based on a first data type of first data corresponding to the first communication type and further based on a second data type of second data corresponding to the second communication type, performing a wireless communication with the UE using the one or more first frequency resources to communicate the first data and using the one or more second frequency resources to communicate the second data.

In a twenty-first aspect, alone or in combination with the twentieth aspect, one of the first communication type or the second communication type is associated with a first part of a frequency spectrum that is different than a second part of the frequency spectrum associated with the other of the first communication type or the second communication type.

In a twenty-second aspect, alone or in combination with one or more of the twentieth through twenty-first aspects, one of the first communication type or the second communication type is associated with a first latency sensitivity that is greater than a second latency sensitivity associated with the other of the first communication type or the second communication type.

In a twenty-third aspect, alone or in combination with one or more of the twentieth through twenty-second aspects, the first communication type corresponds to one of an eMBB communication type or a URLLC communication type, and the second communication type corresponds to the other of the eMBB communication type or the URLLC communication type.

In a twenty-fourth aspect, alone or in combination with one or more of the twentieth through twenty-third aspects, the control information indicates one or more first slots for a downlink communication of the first communication type, one or more second slots for an uplink communication of the first communication type, one or more third slots corresponding to a gap between one or more first slots and the one or more second slots, or a combination thereof.

In a twenty-fifth aspect, alone or in combination with one or more of the twentieth through twenty-fourth aspects, the control information indicates one or more first slots for a downlink communication of the second communication type, one or more second slots for an uplink communication of the second communication type, one or more third slots corresponding to a gap between the one or more first slots and the one or more second slots, or a combination thereof.

In a twenty-sixth aspect, alone or in combination with one or more of the twentieth through twenty-fifth aspects, the control information is transmitted to the UE via a RRC message from the base station, via a MAC-CE from the base station, or via DCI from the base station.

In a twenty-seventh aspect, alone or in combination with one or more of the twentieth through twenty-sixth aspects, the method further includes transmitting, to the UE, a message modifying one or more of a first pattern of uplink to downlink slots associated with the first communication type or a second pattern of uplink to downlink slots associated with the first communication type.

In a twenty-eighth aspect, alone or in combination with one or more of the twentieth through twenty-seventh aspects, the control information further indicates an interleaving pattern, and the interleaving pattern specifies at least a second slot for which the first communication type is associated with the one or more second frequency resources and for which the second communication type is associated with the one or more first frequency resources.

In a twenty-ninth aspect, alone or in combination with one or more of the twentieth through twenty-eighth aspects, the method further includes receiving a request from the UE, where the request indicates one or more characteristics of the control information.

In a thirtieth aspect, alone or in combination with one or more of the twentieth through twenty-ninth aspects, the request indicates one or more of: a first number of the one or more first frequency resources; a second number of the one or more second frequency resources; a first assignment of the one or more first frequency resources to the first communication type; a second assignment of the one or more second frequency resources to the second communication type; a first bandwidth of the one or more first frequency resources; a second bandwidth of the one or more second frequency resources; a first duration during which the first assignment of the one or more first frequency resources is valid; a second duration during which the second assignment of the one or more second frequency resources is valid; a first number of repetitions for which the first assignment of the one or more first frequency resources is valid; or a second number of repetitions for which the second assignment of the one or more second frequency resources is valid.

In a thirty-first aspect, alone or in combination with one or more of the twentieth through thirtieth aspects, the request indicates one or more of a first ratio associated with the first communication type or a second ratio associated with the second communication type.

In a thirty-second aspect, alone or in combination with one or more of the twentieth through thirty-first aspects, the first ratio is based on one or more first slots for a downlink communication of the first communication type, one or more second slots for an uplink communication of the first communication type, one or more third slots corresponding to a gap between the one or more first slots and the one or more second slots, or a combination thereof.

In a thirty-third aspect, alone or in combination with one or more of the twentieth through thirty-second aspects, the second ratio is based on one or more first slots for a downlink communication of the second communication type, one or more second slots for an uplink communication of the second communication type, one or more third slots corresponding to a gap between the one or more first slots and the one or more second slots, or a combination thereof.

In a thirty-fourth aspect, alone or in combination with one or more of the twentieth through thirty-third aspects, the one or more of the first ratio or the second ratio are based on a HARQ roundtrip time associated with the UE or a service quality parameter associated with the UE.

In a thirty-fifth aspect, alone or in combination with one or more of the twentieth through thirty-fourth aspects, the method further includes determining the control information based on at least in part on the request.

In a thirty-sixth aspect, alone or in combination with one or more of the twentieth through thirty-fifth aspects, the method further includes determining the control information further based on at least in part on a first allocation of resources to one or more other UEs in communication with the base station.

In a thirty-seventh aspect, alone or in combination with one or more of the twentieth through thirty-sixth aspects, the method further includes transmitting, to a second base station, a first indication of the first allocation of resources.

In a thirty-eighth aspect, alone or in combination with one or more of the twentieth through thirty-seventh aspects, the method further includes receiving, from a second base station, a second indication of a second allocation of resources to one or more other UEs in communication with the second base station and determining the control information based at least in part on the second allocation of resources.

In a thirty-ninth aspect, the method includes any combination of the twentieth through thirty-eighth aspects.

In a fortieth aspect, an apparatus includes a memory and one or more processors coupled to the memory. The one or more processors are configured to transmit, to a UE, control information indicating one or more first frequency resources of a BWP that are associated with a first communication type and further indicating one or more second frequency resources of the BWP that are associated with a second communication type. The one or more processors are further configured to perform, based on a first data type of first data corresponding to the first communication type and further based on a second data type of second data corresponding to the second communication type, a wireless communication with the UE using the one or more first frequency resources to communicate the first data and using the one or more second frequency resources to communicate the second data.

In a forty-first aspect, an apparatus includes means for transmitting, to a UE, control information indicating one or more first frequency resources of a BWP that are associated with a first communication type and further indicating one or more second frequency resources of the BWP that are associated with a second communication type. The apparatus further includes means for performing, based on a first data type of first data corresponding to the first communication type and further based on a second data type of second data corresponding to the second communication type, a wireless communication with the UE using the one or more first frequency resources to communicate the first data and using the one or more second frequency resources to communicate the second data.

In a forty-second aspect, a non-transitory computer-readable medium stores instructions executable by a processor to perform operations. The operations include transmitting, to a UE, control information indicating one or more first frequency resources of a BWP that are associated with a first communication type and further indicating one or more second frequency resources of the BWP that are associated with a second communication type. The operations further include, based on a first data type of first data corresponding to the first communication type and further based on a second data type of second data corresponding to the second communication type, performing a wireless communication with the UE using the one or more first frequency resources to communicate the first data and using the one or more second frequency resources to communicate the second data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof. In addition, one or more features described herein may be implemented via specialized processor circuitry, via executable instructions, and/or combinations thereof.

Those of skill would further appreciate that the various illustrative logical blocks, modules, circuits, and operations (e.g., the operations of FIG. 4, the operations of FIG. 5, or both) described in connection with the disclosure herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication performed by a user equipment (UE), the method comprising:
    transmitting an indication that the UE supports communication associated with a first communication type using a first version of an uplink bandwidth part (BWP); and
    receiving control information indicating one or more first frequency resources of the first version of the uplink BWP, the one or more first frequency resources associated with the first communication type, a second version of the uplink BWP including one or more second frequency resources that are associated with a second communication type different than the first communication type, wherein the indication indicates one or more of a first ratio associated with the first communication type or a second ratio associated with the second communication type, wherein the second ratio is associated with a downlink communication of the second communication type, an uplink communication of the second communication type, a gap between the downlink communication and the uplink communication, or a combination thereof.

2. The method of claim 1, wherein the indication indicates one or more characteristics of the control information.

3. The method of claim 1, wherein the indication indicates one or more of:
    a first number of the one or more first frequency resources;
    a second number of the one or more second frequency resources;
    a first assignment of the one or more first frequency resources to the first communication type;
    a second assignment of the one or more second frequency resources to the second communication type;
    a first bandwidth of the one or more first frequency resources;
    a second bandwidth of the one or more second frequency resources;
    a first duration during which the first assignment of the one or more first frequency resources is valid;
    a second duration during which the second assignment of the one or more second frequency resources is valid;
    a first number of repetitions for which the first assignment of the one or more first frequency resources is valid; or
    a second number of repetitions for which the second assignment of the one or more second frequency resources is valid.

4. The method of claim 1, wherein the first ratio is based on one or more first slots for a downlink communication of the first communication type, one or more second slots for an uplink communication of the first communication type, one or more third slots corresponding to a gap between the one or more first slots and the one or more second slots, or a combination thereof.

5. The method of claim 1, wherein the second ratio is based on one or more first slots for the downlink communication of the second communication type, one or more second slots for the uplink communication of the second communication type, one or more third slots corresponding to a gap between the one or more first slots and the one or more second slots, or a combination thereof.

6. The method of claim 1, wherein the UE selects one or more of the first ratio or the second ratio based on a hybrid automatic repeat request (HARQ) roundtrip time associated with the UE or a service quality parameter associated with an application of the UE.

7. The method of claim 1, wherein the control information is received by the UE via a radio resource control (RRC) message, via a medium access control (MAC) control element (MAC-CE), or via downlink control information (DCI).

8. An apparatus for wireless communication performed by a user equipment (UE), the apparatus comprising:
    a memory; and
    one or more processors coupled to the memory and configured to:
        transmit an indication that the UE supports communication associated with a first communication type using a first version of an uplink bandwidth part (BWP); and receive control information indicating one or more first frequency resources of the first version of the uplink BWP, the one or more first frequency resources associated with the first communication type, a second version of the uplink BWP including one or more second frequency resources that are associated with a second communication type different than the first communication type, wherein the indication indicates one or more of a first ratio associated with the first communication type or a second ratio associated with the second communication type, wherein the second ratio is associated with a downlink communication of the second communication type, an uplink communication of the second communication type, a gap between the downlink communication and the uplink communication, or a combination thereof.

9. The apparatus of claim 8, wherein the one or more processors are further configured to receive a message modifying one or more of a first pattern of uplink to downlink slots associated with the first communication type or a second pattern of uplink to downlink slots associated with the first communication type.

10. The apparatus of claim 8, wherein the control information further indicates an interleaving pattern, and wherein the interleaving pattern specifies at least one slot for which the first communication type is associated with the one or more second frequency resources and for which the second communication type is associated with the one or more first frequency resources.

11. The apparatus of claim 8, wherein one of the first communication type or the second communication type is associated with a first part of a frequency spectrum that is different than a second part of the frequency spectrum associated with the other of the first communication type or the second communication type.

12. The apparatus of claim 8, wherein one of the first communication type or the second communication type is associated with a first latency sensitivity that is greater than a second latency sensitivity associated with the other of the first communication type or the second communication type.

13. The apparatus of claim 8, wherein the first communication type corresponds to one of an enhanced mobile broadband (eMBB) communication type or a ultra-reliable low-latency communications (URLLC) communication type, and wherein the second communication type corresponds to the other of the eMBB communication type or the URLLC communication type.

14. The apparatus of claim 8, wherein the control information indicates one or more first slots for a downlink communication of the first communication type, one or more second slots for an uplink communication of the first communication type, one or more third slots corresponding to a gap between the one or more first slots and the one or more second slots, or a combination thereof.

15. The apparatus of claim 8, wherein the control information indicates one or more first slots for a downlink communication of the second communication type, one or more second slots for an uplink communication of the second communication type, one or more third slots corresponding to a gap between the one or more first slots and the one or more second slots, or a combination thereof.

16. A method of wireless communication performed by a network entity, the method comprising:

receiving an indication that a user equipment (UE) supports communication associated with a first communication type using a first version of an uplink bandwidth part (BWP); and transmitting control information indicating one or more first frequency resources of the first version of the uplink BWP, the one or more first frequency resources associated with the first communication type, a second version of the uplink BWP including one or more second frequency resources that are associated with a second communication type, wherein the indication indicates one or more of a first ratio associated with the first communication type or a second ratio associated with the second communication type, wherein the second ratio is associated with a downlink communication of the second communication type, an uplink communication of the second communication type, a gap between the downlink communication and the uplink communication, or a combination thereof.

17. The method of claim 16, further comprising transmitting a message modifying one or more of a first pattern of uplink to downlink slots associated with the first communication type or a second pattern of uplink to downlink slots associated with the first communication type.

18. The method of claim 16, wherein the control information further indicates an interleaving pattern, and wherein the interleaving pattern specifies at least one slot for which the first communication type is associated with the one or more second frequency resources and for which the second communication type is associated with the one or more first frequency resources.

19. The method of claim 16, wherein the indication indicates one or more characteristics of the control information.

20. The method of claim 16, wherein the indication indicates one or more of:
a first number of the one or more first frequency resources;
a second number of the one or more second frequency resources;
a first assignment of the one or more first frequency resources to the first communication type;
a second assignment of the one or more second frequency resources to the second communication type;
a first bandwidth of the one or more first frequency resources;
a second bandwidth of the one or more second frequency resources;
a first duration during which the first assignment of the one or more first frequency resources is valid;
a second duration during which the second assignment of the one or more second frequency resources is valid;
a first number of repetitions for which the first assignment of the one or more first frequency resources is valid; or
a second number of repetitions for which the second assignment of the one or more second frequency resources is valid.

21. The method of claim 16, wherein the first ratio is based on one or more first slots for a downlink communication of the first communication type, one or more second slots for an uplink communication of the first communication type, one or more third slots corresponding to a gap between the one or more first slots and the one or more second slots, or a combination thereof.

22. The method of claim 16, wherein the second ratio is based on one or more first slots for the downlink communication of the second communication type, one or more second slots for the uplink communication of the second communication type, one or more third slots corresponding to a gap between the one or more first slots and the one or more second slots, or a combination thereof.

23. The method of claim 16, wherein the one or more of the first ratio or the second ratio are based on a hybrid automatic repeat request (HARQ) roundtrip time associated with the UE or a service quality parameter associated with the UE.

24. An apparatus for wireless communication performed by a network entity, the apparatus comprising:
a memory; and
one or more processors coupled to the memory and configured to:
receiving an indication that a user equipment (UE) supports communication associated with a first communication type using a first version of an uplink bandwidth part (BWP); and
transmit control information indicating one or more first frequency resources of the first version of the uplink BWP, the one or more first frequency resources associated with the first communication type, a second version of the uplink BWP including one or more second frequency resources that are associated with a second communication type different than the first communication type, wherein the indication indicates one or more of a first ratio associated with the first communication type or a second ratio associated with the second communication type, wherein the second ratio is associated with a downlink communication of the second communication type, an uplink communication of the second communication type, a gap between the downlink communication and the uplink communication, or a combination thereof.

25. The apparatus of claim 24, wherein the one or more processors are further configured to determine the control information based at least in part on a first allocation of resources to one or more UEs in communication with the network entity.

26. The apparatus of claim 25, wherein the one or more processors are further configured to transmit, to a second network entity, a first indication of the first allocation of resources.

27. The apparatus of claim 24, wherein the one or more processors are further configured to:
receive, from a second network entity, a second indication of a second allocation of resources to one or more UEs in communication with the second network entity; and
determine the control information based at least in part on the second allocation of resources.

28. The apparatus of claim 24, wherein each frequency resource of the one or more first frequency resources is distinct from each frequency resource of the one or more second frequency resources.

29. The apparatus of claim 24, wherein the one or more processors are further configured to:
receive a first wireless communication from the UE via the first version of the uplink BWP; and
receive one or more second wireless communications from the one or more other UEs via the second version of the uplink BWP.

* * * * *